United States Patent
Peel

(10) Patent No.: US 9,490,859 B2
(45) Date of Patent: Nov. 8, 2016

(54) DUAL HOLDING CASE FOR COMPUTING DEVICES

(71) Applicant: Douglas Peel, Riyadh (SA)

(72) Inventor: Douglas Peel, Riyadh (SA)

( * ) Notice: Subject to any disclaimer, the term of this patent is extended or adjusted under 35 U.S.C. 154(b) by 1 day.

(21) Appl. No.: 14/330,289

(22) Filed: Jul. 14, 2014

(65) Prior Publication Data

US 2015/0111624 A1  Apr. 23, 2015

Related U.S. Application Data

(60) Provisional application No. 61/892,537, filed on Oct. 18, 2013.

(51) Int. Cl.
| | |
|---|---|
| *H04M 1/00* | (2006.01) |
| *H04B 1/3888* | (2015.01) |
| *H04B 1/3877* | (2015.01) |
| *H04M 1/02* | (2006.01) |
| *H04M 1/18* | (2006.01) |

(52) U.S. Cl.
CPC .......... *H04B 1/3888* (2013.01); *H04B 1/3877* (2013.01); *H04M 1/0214* (2013.01); *H04M 1/185* (2013.01)

(58) Field of Classification Search
CPC ............. H04B 1/3888; H04B 1/3877; H04M 1/0214; H04M 1/185
See application file for complete search history.

(56) References Cited

U.S. PATENT DOCUMENTS

| | | | | |
|---|---|---|---|---|
| 5,105,338 | A * | 4/1992 | Held ..................... | G06F 1/1628 190/109 |
| 8,763,795 | B1 * | 7/2014 | Oten ...................... | A45C 11/00 206/320 |
| 2013/0079067 | A1 * | 3/2013 | Peng ................... | H04M 1/0283 455/575.1 |
| 2013/0175200 | A1 * | 7/2013 | Poon ...................... | F16M 13/00 206/759 |
| 2013/0258586 | A1 * | 10/2013 | Shao ..................... | A45C 11/00 361/679.55 |
| 2014/0034521 | A1 * | 2/2014 | Liu ........................ | A45C 11/00 206/45.23 |

* cited by examiner

*Primary Examiner* — Timothy Pham
(74) *Attorney, Agent, or Firm* — Jennifer Meredith, Esq.; Meredith & Keyhani, PLLC

(57) ABSTRACT

A dual holding case for mobile computing devices comprising: an outer portion having a long axis along substantially the center of the outer portion; a divider that runs longitudinally along the long axis of the outer portion to provide a left side and a right side, wherein the left side has at least one left side opening and at least one left side attachment means and the right side has at least one right side opening and at least one right side attachment means.

5 Claims, 5 Drawing Sheets

1- snap
2- long axis
3- left side attachment means
4- divider
5- rectangular right side opening
6- larger rectangular left side opening
7- right side attachment means
20- left side
22- right side
104- outer portion

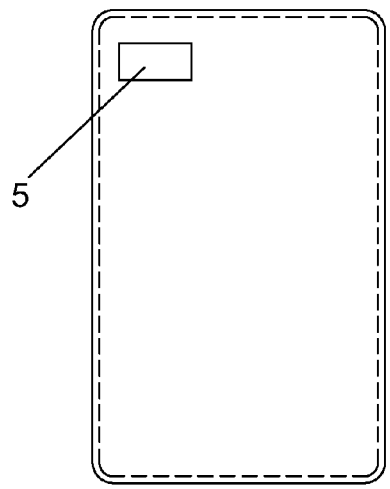
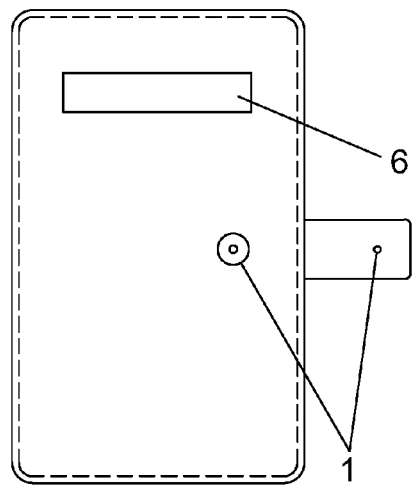
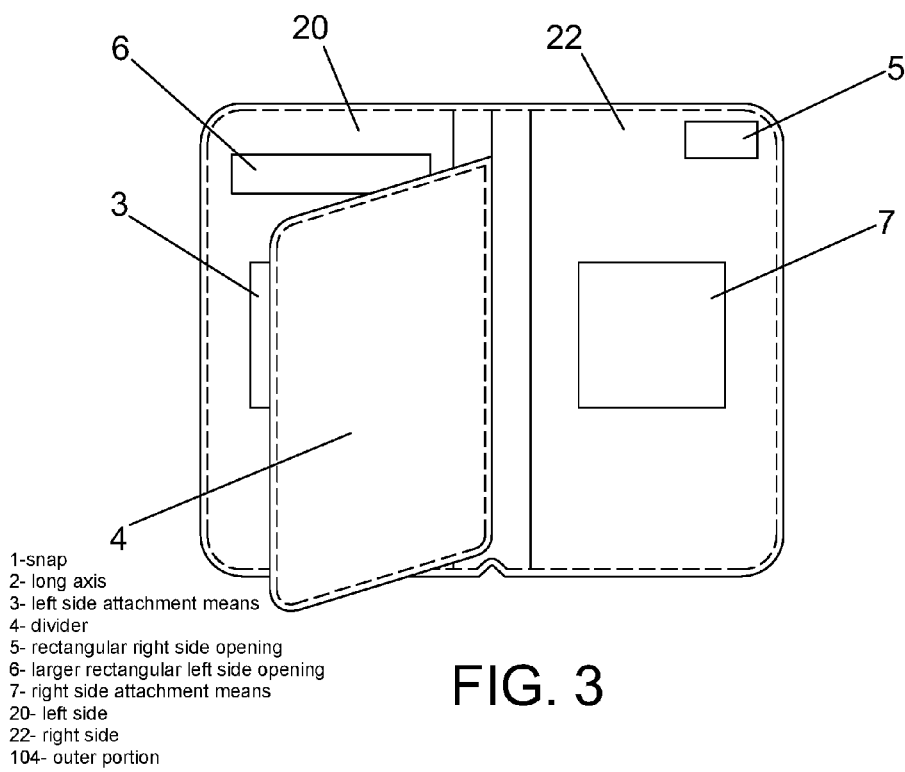
FIG. 1
FIG. 2
FIG. 3
1- snap
2- long axis
3- left side attachment means
4- divider
5- rectangular right side opening
6- larger rectangular left side opening
7- right side attachment means
20- left side
22- right side
104- outer portion 2- long axis
4- divider
20- left side
22- right side
102- second computing device
400- stand 100 - first computing device
102 - second computing device 4- divider
5- rectangular right side opening
6- larger rectangular left side opening 6- larger rectangular left side opening
700- camera

DUAL HOLDING CASE FOR COMPUTING DEVICES

This application claims priority to provisional patent application No. 61/892,537 filed Oct. 18, 2013 and entitled "Dual Holding Case for Computing Devices" the entire contents of which are incorporated herein by reference.

The present invention relates to a holder for holding two mobile computing devices.

In today's highly connected world, individuals may have multiple computing devices. By way of example, they may have an iPhone® and a Blackberry®. Similarly, they may have a Kindle® handheld and an ipad mini. Each computing device may serve a different purpose. By way of example, the iPhone® may be for personal use and the Blackberry® for work purposes. Another example is that the Kindle® may be used to read books and the ipad® mini may be used to surf the Internet. Carrying multiple devices can be clunky and hard to find. Further having two separate devices each with their own case adds to the amount of space they take in the pocket or in a bag. Another problem is the cost of purchasing two carrying cases, instead of one.

The present invention solves this problem by providing a single carrying case that holds two types of mobile computing devices. The two mobile computing devices may be of the same type or dissimilar in type. The computing device may be pocket sized (such as smartphones) or handheld size (such as mini ipads) but both devices are typically of a similar size. Also, the present invention solves the problem of requiring a separate stand, by allowing the divider (an optionally the second computing device, if it is attached) to act as a stand to prop up a first computing device. This also solves the problem of buying two different stands, as each of the different devices typically require different stands.

These and other features, aspects and advantages of the present invention will become better understood with reference to the following description and claims.

SUMMARY OF THE INVENTION

The present invention relates generally to cases for computing devices.

According to one embodiment, a dual holding case for mobile computing devices is provided with an outer portion having a long axis along substantially the center of the outer portion; and a divider that runs longitudinally along the long axis of the outer portion to provide a left side and a right side, wherein the left side has at least one left side opening and at least one left side attachment means and the right side has at least one right side opening and at least one right side attachment means.

According to another embodiment, a dual holding case for mobile computing devices is provided with an outer portion having a long axis along substantially the center of the outer portion; and a divider that runs longitudinally along the long axis of the outer portion to provide a left side and a right side, wherein the left side has at least one left side opening and at least one left side attachment means and the right side has at least one right side opening and at least one right side attachment means, wherein the at least one left side opening is dissimilar in size and location from the at least one right side opening.

These and other features, aspects and advantages of the present invention will become better understood with reference to the following description and claims.

BRIEF DESCRIPTION OF THE DRAWINGS

FIG. 1 depicts a back view of one embodiment of the present invention in a closed position;

FIG. 2 depicts a front view of one embodiment of the present invention in a closed position;

FIG. 3 depicts a front view of one embodiment of the present invention in an open position;

DETAILED DESCRIPTION OF THE INVENTION

Figure 4:
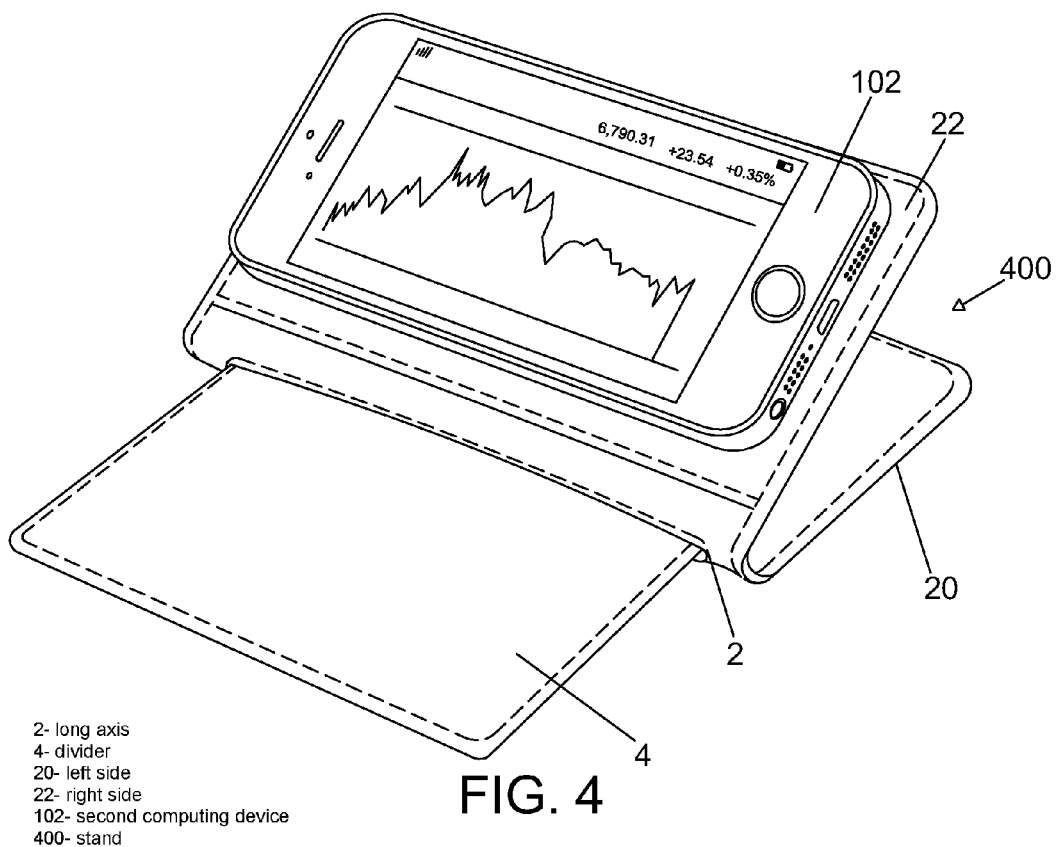
FIG. 4 depicts the present invention with a mobile computing device attached and being used as a stand.
Figure 5:
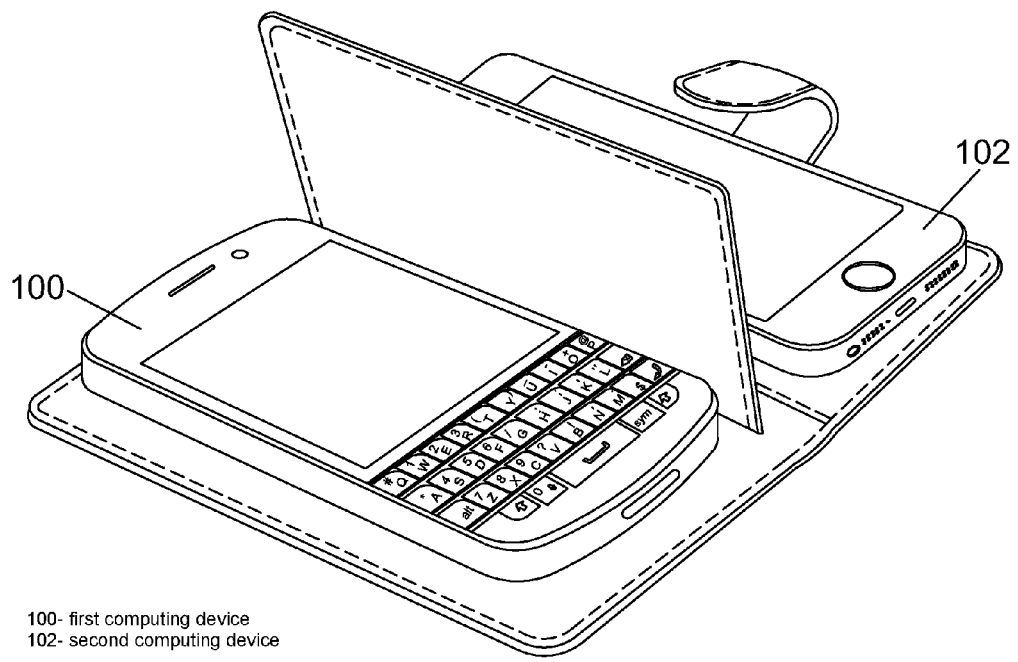
FIG. 5 depicts a front view of the present invention with two mobile computing devices attached in an open position.
Figure 6:
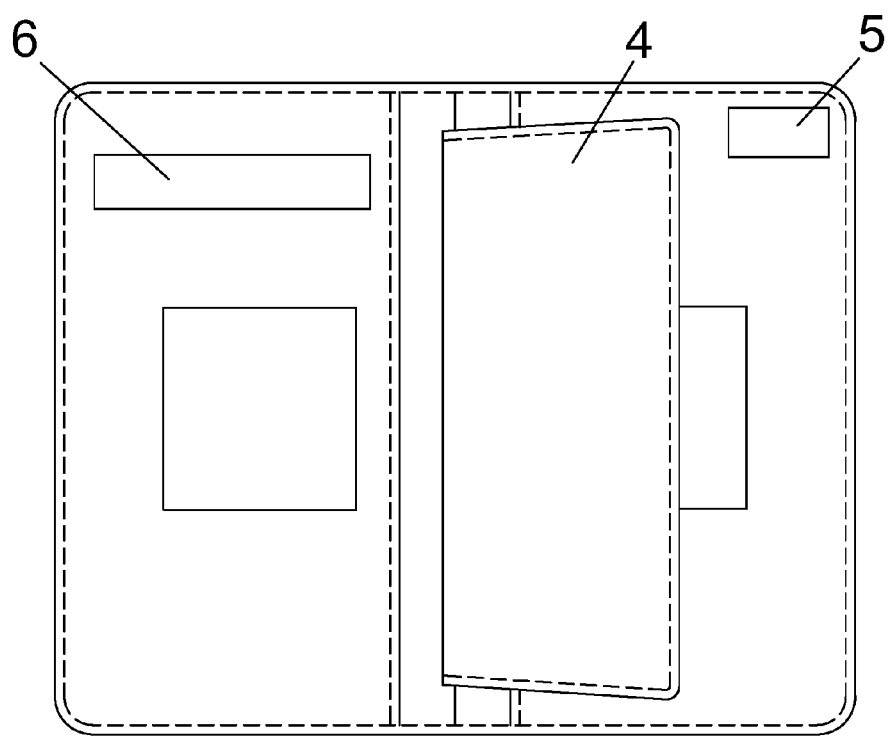
FIG. 6 depicts a front view of an actual device in an open position.

The following detailed description is of the best currently contemplated modes of carrying out the invention. The description is not to be taken in a limiting sense, but is made merely for the purpose of illustrating the general principles of the invention, since the scope of the invention is best defined by the appended claims.

With reference to FIGS. 1-7, the present invention provides a dual holding case for mobile computing devices (100, 102). The invention is a pocket-sized, folding, dual case. The holding case may have a snap (1) or similar closure means for two smartphones or similar devices. For example, the closure means may also be a magnetic closure or an opening with that receives a flat piece of material (such as leather). The closure means may be any means that would secure the left side (20) to the right side (22) in a closed position. The case may open fully (360 degrees) around the long axis (2), which allows it to be held comfortably in one hand and for either device to be used for voice calls or other purposes without detaching the relevant device from the holder. Each device may be secured to one of the inside covers of the case using a hook-and-loop system (3), holding it securely in place, but permitting it to be detached easily when this is required. The devices are separated by a divider (4), to protect their screens when the holder is closed. The covers of the holder have apertures that are placed to enable the use of smartphone cameras without detaching the smartphones from the case. The case permits full access to controls and ports on the front and sides of each smartphone without detaching it from the holder. The case fits comfortably in a jacket, trouser pocket, purse and/or handbag allowing a person who uses two devices to carry both of them conveniently in a single case.

The device may have an outer portion (104) having a long axis (2) along substantially the center of the outer portion (104). A divider (4) runs longitudinally along the long axis (2) of the outer portion (104) to provide a left side (20) and a right side (22), wherein the left side (20) has at least one larger rectangular left side opening (6) and at least one left side attachment means (3) and the right side (22) has at least one rectangular right side opening (5) and at least one right side attachment means (7).

The left side attachment means (3) and the right side attachment means (7) may be selected from the group consisting of a hook and loop system, sticky membrane, magnetic systems, grip material and double sided tape. A hook and loop system may also be known by those of ordinary skill in the art as VELCRO™. A sticky membrane may be, by way of example, Geckskin™ an integrated adhesive with a soft pad woven into a stiff fabric. A magnetic system may be two pieces of opposed magnetic parts that are flat with one side glued or taped to a portion of the holding case and the other side glue or taped to the computing device. By way of example, one side of the magnet may be glued to the left side (20) and the other opposing side of the magnet may be glued to the first computing device (100). A grip material may be, for example, a silicone gel pad or a soft elastomer. Industrial strength double sided tape may also be used to secure a first computing device or a second computing device.

The divider (4) may be made of a stiffened material. This may be accomplished by taking two pieces of leather and sewing them together. Alternatively, the material may be treated with a fabric stiffener, such as Aleene's fabric stiffener. According to another embodiment, a piece of cardboard may be sewn between two pieces or material to form the divider (4). The divider being made of a stiffened material may be particularly useful for forming the stand, as depicted in FIG. 4. The divider (4) and at least one of the left side and the right side may be in a position to form a stand (400) to the support at least one of the first computing device (100) and the second computing device (102) on at least one of the left side (20) and the right side (22). In the example shown in FIG. 4, the left side (20) and the divider (4) are placed in a downward facing position on a flat surface (such as a table). The right side (22) is bent backward to form a V shape from the rights side (22) and the left side (20). The divider (4) extends from the long axis (2) with one side of the divider on the flat surface. There may or may not be a computing device attached to the left side (20). A computing device attached to the side that is on the flat surface may provide additional stability to the second computing device (102) being propped up by the stand (400). The stand may also be flipped, so that the left side (20) is upwards and the right side (22) is downwards on the flat surface (such as a table). In this case, the stand (400) would act as a stand for the first computing device (100) which would be viewable and capable of use by the user.

Figure 7:
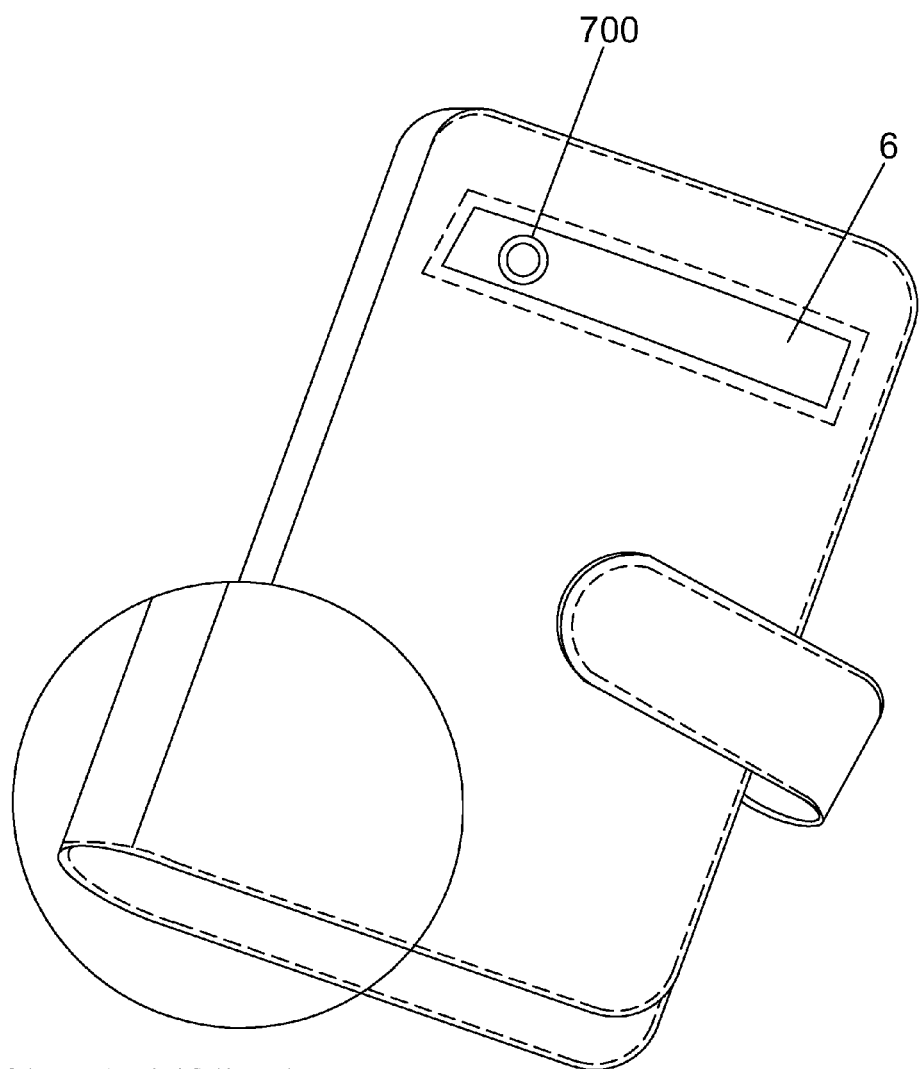
FIG. 7 depicts a front view showing a camera of a computing device in an opening.

As depicted in FIG. 7, the larger rectangular left side opening (6) is along the top portion of the left side and correlates to the height position of a camera (700) in a first computing device (100) when the first computing device is attached to at least one left side attachment means (3). Similarly, by not depicted in FIG. 7, the rectangular right side opening (5) is along the top portion of the right side and correlates to the height position of a camera in a second computing device (102) when the second computing device is attached to at least one right side attachment means (7).

The first computing device (100) and the second computing device (102) may be the same or different. Because of this, the lamer rectangular left side opening (6) and the rectangular right side opening (5) may be in similar locations/positions or different locations/positions. Also, they may be of different sizes, as in the example shown in FIGS. 1-3. Also, the opening may be of a larger size, as depicted in the larger rectangular left side opening (6) to accommodate a variety of camera positions on different cell phones. By way of example, the first computing device and the second computing device may be an ipad, iphone, BlackBerry, Samsung Galaxy, HTC One, Nokia Lumia, Motorola Droid, Huawei Ascend, LG Optimus, Casio G'z One Commando, Sony Xperia, Kindle, Motorola Moto, LG G Flex, ZTE Open, Nvidia Shield, Samsumg ATIV Odyssey, HTC Droid DNA, Huawei MediaPad, Google Android and Samsung Galaxy Note. Of course, the future will bring different types and kinds of computing devices, which are intended to be utilized by the present invention without departing from the scope of the present invention. The first computing device and the second computing device may be of relatively similar size. By way of example, an ipad mini may be a first computing device and a kindle fire may be the second computing device. Another example would be an iphone as a first computing device and a blackberry as a second computing device. The example with the ipad mini would be larger in size than the example with the iphone. The present invention envisions all different size and types of computing devices without departing from the present invention.

It should be understood that the foregoing relates to preferred embodiments of the invention and that modifications may be made without departing from the spirit and scope of the invention as set forth in the following claims.

I claim:

1. A dual holding case for mobile computing devices comprising:
   an outer portion having a long axis along substantially the center of the outer portion;
   a divider that runs longitudinally along the long axis of the outer portion to provide a left side and a right side, wherein the left side has at least one larger rectangular left side opening along the top portion of the left side which correlates to a height position of a camera in a first computing device when the first computing device is attached to at least one left side attachment means and the right side has at least one rectangular right side opening along the top portion of the right side which correlates to a height position of a camera in a second computing device when the second computing device is attached to at least one right side attachment means,
   wherein the left side attachment means is selected from the group consisting of a hook and loop system, sticky membrane, magnetic systems, grip material and double sided tape;
   wherein the right side attachment means is selected from the group consisting of a hook and loop system, sticky membrane, magnetic systems, grip material and double sided tape;
   wherein the at least one larger rectangular left side opening is dissimilar in size and location from the at least one rectangular right side opening; and
   wherein the divider and at least one of the left side and the right side form a stand that supports at least one of the first computing device and the second computing device on at least one of the left side and the right side.

2. The dual holding case as in claim 1, wherein the divider is made of a stiffened material.

3. The dual holding case as in claim 1, wherein the first computing device is selected from the group consisting of ipad, iphone, BlackBerry, Samsung Galaxy, HTC One, Nokia Lumia, Motorola Droid, Huawei Ascend, LG Optimus, Casio G'z One Commando, Sony Xperia, Kindle, Motorola Moto, LG G Flex, zTE Open, Nvidia Shield, Samsumg ATIY Odyssey, HTC Droid DNA, Huawei MediaPad, Google Android and Samsung Galaxy Note.

4. The dual holding case as in claim 1, wherein the second computing device is selected from the group consisting of ipad, iphone, BlackBerry, Samsung Galaxy, HTC One, Nokia Lumia, Motorola Droid, Huawei Ascend, LG Optimus, Casio G"z One Commando, Sony Xperia, Kindle, Motorola Moto, LG G Flex, ZTE Open, Nvidia Shield, Samsumg ATIY Odyssey, HTC Droid DNA, Huawei MediaPad, Google Android and Samsung Galaxy Note.

5. The dual holding case in claim 1, further comprising a closure means.

* * * * *